United States Patent [19]
Venkataswamy

[11] Patent Number: 5,942,577
[45] Date of Patent: Aug. 24, 1999

[54] TEMPERATURE-STABLE LOW SOLVENT-SWELLING THERMOPLASTIC ELASTOMER COMPOSITIONS

[75] Inventor: Krishna Venkataswamy, Akron, Ohio

[73] Assignee: Advanced Elastomer Systems, L.P., Akron, Ohio

[21] Appl. No.: 08/926,672

[22] Filed: Sep. 9, 1997

Related U.S. Application Data

[63] Continuation of application No. 08/659,698, Jun. 5, 1996, abandoned.

[51] Int. Cl.$^6$ .............................. C08L 33/14; C08L 33/08; C08L 69/00; C08L 77/00
[52] U.S. Cl. ........................... 525/148; 525/176; 525/181; 525/183
[58] Field of Search ..................................... 525/148, 176, 525/181, 183

[56] References Cited

U.S. PATENT DOCUMENTS

| | | | |
|---|---|---|---|
| 4,399,262 | 8/1983 | Jablonski | 525/349 |
| 4,434,274 | 2/1984 | Jablonski | 525/349 |
| 4,910,245 | 3/1990 | Flynn et al. | 524/298 |
| 4,978,703 | 12/1990 | Ainsworth et al. | 524/298 |
| 4,978,716 | 12/1990 | Flynn et al. | 525/195 |
| 5,300,573 | 4/1994 | Patel | 525/109 |
| 5,376,712 | 12/1994 | Nakajima | 525/183 |

FOREIGN PATENT DOCUMENTS

0337976A2  10/1989  European Pat. Off. .

OTHER PUBLICATIONS

Rubber Blue Book, a product of Rubber World, published by Lippincott & Peto in Akron, Ohio on about Mar. 1, 1986 pp. 100 and 378.
An article entitled "New Thiadiazole Cure Systems Offers Benefits to Chlorinated Polymers" by M.C. Salerno in Elastomerics published by Communication Channels, Inc., in Atlanta, Georgia on Apr. 1, 1992.

*Primary Examiner*—David Buttner
*Attorney, Agent, or Firm*—Samuel B. Laferty; William A. Skinner

[57] ABSTRACT

A thermoplastic elastomer is formed from a thermoplastic polymer such as a polyester, polycarbonate, or combinations thereof or a polyamide, which polymer is melt blended with an acrylic rubber. The acrylic rubber desirably has from about 0.5 to about 5 mole percent repeat units from halogen (desirably chlorine) containing monomer. Subsequently the acrylic rubber is crosslinked with 2,5-mercapto-1,3,4-thiadiazole or a derivative thereof. Such a thermoplastic elastomer may have a compression set less than 50% making it useful in applications involving continuous use under compression.

8 Claims, No Drawings

TEMPERATURE-STABLE LOW SOLVENT-SWELLING THERMOPLASTIC ELASTOMER COMPOSITIONS

This application is a continuation of application Ser. No. 08/659,698 filed Jun. 5, 1996, now abandoned.

The present invention relates to thermoplastic elastomers comprising a polar polymer such as polyesters, polycarbonates, or polyamides mixed with acrylate rubbers which are subsequently cured with a thiadiazole curative. The resulting thermoplastic elastomers have elastomeric properties but can be easily molded and shaped above the softening temperature of the thermoplastic polar polymer. The thermoplastic elastomers desirably have lower compression set than similar compositions cured with other curatives.

BACKGROUND OF THE INVENTION

Thermoplastic elastomers from polar polymers such as polyesters, polycarbonates, or polyamides blended with acrylate rubbers, which acrylate rubbers are subsequently cured, are known to the art. Thiadiazole curatives are known for curing chlorinated polyethylene in thermoplastic elastomers (see for examples U.S. Pat. Nos. 4,910,245; 4,978,703; and 4,978,716).

SUMMARY OF THE INVENTION

Thermoplastic elastomers are formed from dynamic vulcanization with thermoplastic polar polymer comprising a polyester, polycarbonate, or polyamide or combinations of polyester and polycarbonate with an acrylate rubber crosslinked with a curing system comprising 2,5-mercapto-1,3,4 thiadiazole. This thiadiazole curative results in a fast cure and thermoplastic elastomers with desirable high elongations at break, controllable modulus and/or Shore A hardness, and desirable low compression set at elevated temperatures. The acrylate polymers desirably have from about 0.5 to about 5 mole percent of halogen containing repeat units. A particularly desirable thermoplastic elastomer is one where the polar polymer is polybutylene terephthalate and the acrylic polymer is a copolymer of ethylacrylate and 0.5–5 mole percent vinyl chloroacetate which thermoplastic elastomer can exhibit a compression set at 150° C. for 70 hours of less than 50 percent. Thermoplastic elastomers from these polymers with low compression set (i.e. less than 50 percent) are particularly desirably as sealants.

DETAILED DESCRIPTION OF THE INVENTION

Thermoplastic elastomer compositions of the present invention comprise at least one polar thermoplastic polymer and at least one acrylate rubber crosslinked with a thiadiazole.

The thermoplastic polar polymer can be a polyester, a polycarbonate or a polyamide or combinations of polyester and polycarbonate. The terms "polymer," "polyester," "polycarbonate" and "polyamide" are defined to include copolymer, terpolymer etc., random, blocky and other variations. The at least one thermoplastic polar polymer may have functional or reactive end groups or pendant groups such as epoxy in amounts insufficient to result in a thermoset material. These reactive groups are not required and the thermoplastic polar polymer(s) is intended to remain thermoplastic and not be thermoset so the material can be shaped and molded. The thermoplastic polar polymers desirably have a weight average molecular weight from above 10,000 to about 50,000 more desirably from about 15,000 to about 40,000. Polyesters are preferred and are desirably the result of polyester condensation reactions of dicarboxylic acids or their anhydrides with diols or alkylene oxides. Polar polymers with a melting or softening temperature between about 160° C. and about 280° C. are desirable (crystalline polymers are slightly preferred). Alternatively polyesters can be prepared from ring opening polymerizations of lactones such as caprolactone. If the dicarboxylic acids or anhydrides thereof are aliphatic they desirably have from about 2 to 20 carbon atoms, if aromatic from 8 to 15 or 20 carbon atoms. The diols or alkylene oxides desirably have from 2 to 12 carbon atoms, more desirably from 2 to 6 or 2 to 4. Generally aromatic polyesters are preferred such as polyethylene terephthalate, polybutyleneterephthalate, polyethyleneisophthalate, polynaphthalenephthalate and the like as well as an epoxy endcapped derivative thereof e.g., a monofunctional epoxy polybutylenephthalate. Various polycarbonates can also be utilized and the same are esters of carbonic acid. These are commercially available and are made by esterification of carbonic acid or phosgene with diols or alkylene oxides having from 2 to 20 carbon atoms such as ethylene diol, diethylene glycol, and bisphenol A. The polycarbonates may also be prepared by transesterification polymerizations. An example of a polycarbonate is poly(carbonyldioxyl,4-phenylene-iso-propylidene-1,4-phenylene).

The various polyester polymers also include block copolyesters such as those containing at least one block of polyester and at least one rubbery block such as a polyether derived from glycols having from 2 to 6 carbon atoms, e.g., polyethylene glycol, or from alkylene oxides having from 2 to 6 carbon atoms. A preferred block polyester is polybutyleneterephthalate-b-polyethylene glycol which is available as Hytrel™ from DuPont.

Polyamides are polymers having a —C(O)N(H)— linkage. They are often formed from the condensation reactions of dicarboxylic acids or their anhydrides with diamines. The dicarboxylic acids and their anhydrides may have from 3 to 20 carbon atoms and the diamines may have from 1 to 20 carbon atoms. Examples of polyamides are Nylon 6, Nylon 610, Nylon 66. Polyamides can also be formed from ring opening polymerizations of cyclic lactams such as caprolactam.

The acrylic rubber is at least one acrylate polymer. Specific examples include polymers of ethyl acrylate, butyl acrylate, ethyl-hexyl acrylate and the like. Desirably the acrylates are technologically compatible with polyesters i.e., capable of forming a co-continuous phase with the polyester. The acrylate repeat units are desirably at least 50 mole percent and more desirably at least 60 or 70 mole percent of the acrylate polymers repeat units. The acrylate repeat units including (alkyl)acrylates desirably have a total of from 3 to 18 carbon atoms and desirably from 3 or 5 to 13 carbon atoms.

Desirably to facilitate cure with the thiadiazole curatives the acrylate polymer is a functionalized acrylate having from about 0.2 to about 10 mole percent and more desirably from about 0.5 to about 5 mole percent halogenated repeat units (e.g. a repeat unit with at least one halogen atom) such as derived from vinyl chloroacetate. The halogenated repeat units may be one or more different repeat units having from 2 to 10 carbon atoms. The halogen may be bromine, chlorine, or iodine but chlorine is preferred. Other repeat units of the (alkyl)acrylate may be mono, di, or polycarboxylic acid having from 3 to 15 carbon atoms such as acrylic acid, methacrylic acid, maleic acid or itaconic acid or an anhydride of a said polycarboxylic acid. Desirably the mole percent of mono, di or polycarboxylic acids are less than 15 and more desirably from about 2 to about 8. The acrylate polymer may also include repeat units having epoxy groups such as derived from the polymerization of glycidyl methacrylate or allyl glycidyl ether. Acrylate monomers with hydroxyl pendant groups such as hydroxy-ethyl acrylate may be used. Acrylate monomers such as ethoxy-methyl acrylate lower the Tg of the acrylate rubber and may be present in the acrylate polymer.

Optionally to form copolymers other ethylenically unsaturated monomers having from 2 to 15 carbon atoms may be present such as vinyl acetate, ethylene, acrylic acids, (lkacrylic acids or other carboxylic or anhydride of dicarboxylic acid containing monomers, styrene and alkyl derivatives thereof and conjugated or nonconjugated dienes. Ethylene can be present in amounts from about 10 to about 70 mole percent and more desirably from about 30 to about 60 mole percent of the acrylic rubber. Terpolymers of ethylene, alkyl acrylate, and acrylic acid may also be used. Typically these have from about 35 to about 80 mole percent ethylene, from about 0.5 to 10 mole percent carboxylic acid containing repeat units and from about 10 to about 60 mole percent alkyl acrylate repeat units. An example is Vamac G™ from DuPont. In preferred embodiments ethylene if present is in amounts less than 50 mole percent based on all the repeat units of the at least one acrylic rubber. Desirably the composition excludes chlorinated polyethylene polymers such as disclosed in U.S. Pat. No. 4,978,716 hereby incorporated by reference.

The thermoplastic elastomers of the present disclosure are suitably cured with a cure package comprising a basic material and 2,5-dimercapto-1,3,4-thiadiazole or a derivative thereof. These cure packages are disclosed in U.S. Pat. Nos. 4,128,510 and 4,288,576, the teachings of which are incorporated herein by reference thereto.

Illustrative derivatives of 2,5-dimercapto-1,3,4-thiadiazole include:

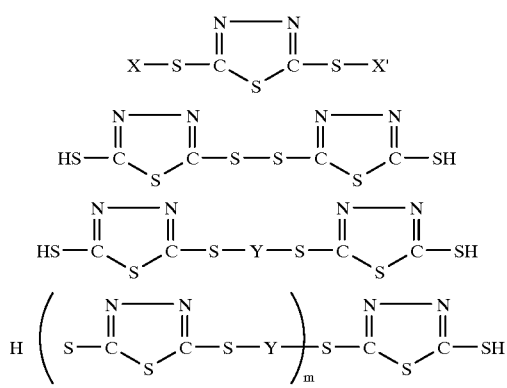

wherein X is a substituent selected from hydrogen, —CRR'OH, —(CH$_2$—CH—O)$_n$H,

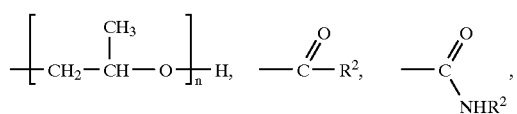

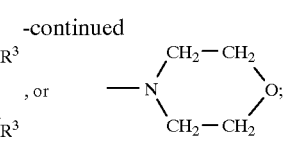

where m is an integer of from 2 to 10; n is an integer from 1 to 5; R and R' are selected from hydrogen, alkyl groups containing 1–8 carbon atoms, and aryl, alkaryl or aralkyl groups containing 6 to 8 carbon atoms; $R^2$ is an alkyl group containing 1–17 carbon atoms, an aryl group containing one or two rings, an alkaryl group containing 7–14 carbon atoms, an aralkyl group containing 7–8 carbon atoms or a cyclohexyl group; each $R^3$ is individually an alkyl group containing 1–8 carbon atoms; X' can be the same as X with the exception of hydrogen; and Y is zinc, lead,

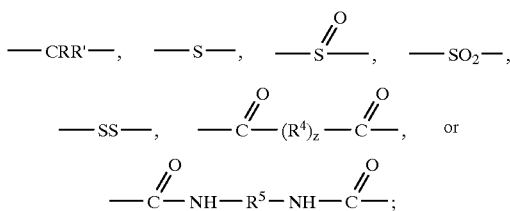

where $R^4$ is an alkylene or alkenylene group containing 1–8 carbon atoms, or a cycloalkylene, arylene or a alkarylene group containing 6–8 carbon atoms; z is 0 or 1; $R^5$ is an alkylene group containing 2–8 carbon atoms or a phenylene, methylphenylene or methylenediphenylene group; and R and R' are as described above. All derivatives of 2,5-dimercapto-1,3,4-thiadiazole can be characterized as comprising at least one

diradical preferably not exceeding 11 diradicals in a single molecule.

Basic materials suitable for use in conjunction with derivatives of 2,5-mercapto-1,3,4,thiadiazole include inorganic materials such as basic metal oxides and hydroxides and their salts with weak acids, such as, for example, magnesium hydroxide, magnesium oxide, calcium oxide, calcium hydroxide, barium oxide, barium carbonate, sodium phenoxide, sodium oleate and sodium acetate. These basic materials also serve as heat stabilizers for halogenated acrylate rubber, e.g. chlorinated. Thus, they are beneficially admixed with the acrylate rubber before the polymer blend is converted to a heat-plastified admixture rather than in conjunction with the thiadiazole derivative. Additional basic material may, if desired, be added together with the thiadiazole derivative. Other basic materials may also be used so long as they do not promote degradation of one of the components of the blend or deactivate the vulcanizing materials. The basic material is preferably sodium oleate.

Basic or activator materials suitable for use in conjunction with 2,5-dimercapto-1,3,4-thiadiazole include (1) amines having a boiling point above about 110° C. at one atmosphere pressure, and a pK value below about 4.5; (2) salts of amines having pK values below about 4.5 with acids having pK values above about 2.0; (3) quaternary ammonium hydroxides and their salts with acids having pK values above about 2.0; (4) diphenyl and ditolyl-guanidines; and (5) the condensation product of aniline and at least one mono-aldehyde containing one to seven carbon atoms, in combination with at least an equal amount of an inorganic base. The term "pK value" refers to the dissociation constants of bases and acids in aqueous solution. Representative values are shown in the Handbook of Chemistry and Physics, 45th Edition, The Chemical Rubber Co., page D-76 (1964). As noted in the preceding paragraph, a certain amount of basic material such as magnesium oxide or magnesium hydroxide may also be present to heat stabilize the halogenated acrylate rubber. The amount of the 2,5-dimercapto-1,3,4-thiadiazole in the thermoplastic elastomer is desirably from about 0.2 to about 8 parts by weight per 100 parts by weight of said acrylate rubber(s) and more desirably from about 0.3 to about 3 or 5 parts by weight and preferably from about 0.5 to about 3 or 5 parts per 100 parts acrylate rubber(s).

The term "blend" or "thermoplastic elastomer" used herein means a mixture ranging from small particles of crosslinked rubber well dispersed in the thermoplastic elastomer matrix to co-continuous phases of the thermoplastic and a partially to fully crosslinked rubber or combinations thereof.

The relative ratio of thermoplastic polar polymer and rubber in the thermoplastic elastomer can vary widely and may affect the resulting properties. The weight ratio for thermoplastic polar polymer to acrylate rubber may be from 1:9 to 6:4. The exact values may vary with the polymers chosen, plasticizer amount, filler amount, and extent of rubber cure. High amounts of rubber may lead to co-continuous rubber phases. Unplasticized compositions with 6:4 ratios are considered by some to be toughened plastics rather than thermoplastic elastomers. Preferred amounts of thermoplastic polymer are from about 20 to about 80 or 100 parts by weight per 100 parts by weight of said acrylate rubber.

The thermoplastic elastomer compositions are preferably prepared by mixing the acrylate rubber and the thermoplastic polar polymer (polyester, polycarbonated, blends thereof, or polyamide) at a temperature (e.g. about 180–280° C. preferably about 225° C.) above the melting point of the thermoplastic polar polymer and crosslinking the rubbery phase during mixing. The thermoplastic rubber and other optional additives are desirably blended at said elevated temperature until they are homogeneous, at which point the at least one curative is added. Other additives such as flow control agents, antioxidants etc. are usually added prior to the curative. The blend is further blended at a temperature and for a time sufficient to crosslink the rubber. The shear rate may have an effect on the size of the dispersed phase or phases. The examples were prepared in a Brabender plasticorder which has therein a torque indicating device. Although the revolutions per minute (rpm) can vary from about 10 to about 150 the samples were run between 90 and 110 revolutions per minute. The samples were mixed, and subsequently crosslinked above the melting point of the thermoplastic polar polymer, until the torque on the Brabender plasticorder maximized and leveled out. Commercial production would desirably use larger batch mixers such as a rubber mill, Banbury, extruders such as a twin screw extruder, or a continuous mixer. The term "melting" in this text can include softening temperature for polymers that can be mixed above a softening temperature. In cases where the curative is slow to initiate crosslinking, then the curative can be added earlier, in that the composition will still be fairly homogenous when the crosslinking commences. Typically mixing and crosslinking can be completed in 0.5–30 minutes. In preparing the examples and controls the sample was cold pressed after the torque maximized and leveled out. Then the sample was returned to the 225° C. Brabender for about one minute of mixing at about 225° C. The composition was then cold pressed into a pancake, then molded at 500° F. (260° C.) into a plaque, and then subjected to standard specimen molding at about 500° F. (260° C.) for the various ASTM tests.

The thermoplastic rubber compositions of the present disclosure desirably are cured via dynamic vulcanization. Dynamic vulcanization means crosslinking the acrylate rubber of the composition of the present invention under high shear and at a temperature sufficient to initiate crosslinking. As a result, the rubber is generally simultaneously crosslinked and dispersed as fine particles of a "microgel" within the thermoplastic polar polymer, e.g., polyester matrix or dispersed as a co-continuous phase or combinations thereof. Sources of high shear include Brabender mixers, Banbury mixers, extruders including twin screw extruders, and the like. A unique characteristic of the composition of the present invention is that while the elastomer rubber portion is crosslinked, the compositions nevertheless can be processed and reprocessed by conventional thermoplastic processing techniques and equipment such as an extruder, injection molding press, compression molding press and the like. An advantage of the thermoplastic elastomers of the present invention is that flashing, scrap, etc., can be salvaged and reprocessed with minimal effort.

The examples and controls of this disclosure can be modified with fillers, plasticizers, other polymers, antioxidants, processing aids, etc. The fillers can modify properties or reduce costs. Fillers include clay, silica, talc, $TiO_2$ carbon black etc. The fillers tend to locate in the rubber phase but may be in the thermoplastic phase depending on their compatibility with the phases and the mixing conditions. Desirably the fillers are present from about 0 or 5 to about 50 parts by weight, more desirably from about 0 or 5 to about 20 parts by weight per 100 parts by weight of the composition. Plasticizers may increase oil resistance heat stability, elasticity and may reduce hysteresis and permanent set. Desirably the plasticizer is from about 5 or 10 to about 50 parts by weight per 100 parts by weight of the composition. Plasticizers include phthalate esters, phosphates, trimellitate esters, sulfonamides, epoxidized oils, and liquid oligomeric plasticizers. Other compounding components include zinc oxide, stearic acid, cure accelerators, antidegradants, prevulcanization inhibitors, fire retardants, coupling agents and the like. Optimal mixing procedures for adding the above ingredients can be readily ascertained through routine experimentation.

The thermoplastic elastomers have utility as compositions to make molded, extruded, or,shaped articles such as for a vehicle (e.g. automobile). These articles can be a seal, tubing, hose, gasket, diaphragm, bellow and the like.

EXAMPLES

Table 1 compares conventional thermoplastic elastomers with conventional acrylate rubber crosslinkers (Control 1, 2 and 3) with the thermoplastic elastomer of this disclosure (Example 4) wherein the acrylate rubber is cured with ECHO A™ (a 2,5-dimercapto-1,3,4-thiadiazole) and NPS Red Oil Soap (technical grade sodium oleate from National Purity Soap and Chemical). In Table 1 the example 4 has better elongation (220 percent) and the lowest compression set (40%) of the four samples. The other physical properties of example 4 were comparable to the controls.

The Table 2 data illustrates the effect of varying the amount of ECHO A™ and NPS Red Oil Soap. As expected the examples 5–7 show that ultimate tensile strength is decreased as the amount of ECHO A™ curative is tripled and the maximum percent elongation is decreased. The other properties are less significantly affected by the amount of ECHO A™.

The data of Table 3 illustrates the effect of varying the amount of poly(butylene terephthalate) from 25 parts to 66.6 parts per 105 parts of acrylate rubber in controls 11, 12 and 13 and Examples 14, 15 and 16. Controls 11, 12 and 13 are using conventional curatives for acrylate rubber while Examples 14, 15 and 16 use Echo A™/NPS Red Oil Soap curative package. The compression set is dramatically lower in the ECHO A™/NPS Red Oil Soap cured elastomers (Examples 14, 15 and 16) than the conventionally cured controls irrespective of the poly(butylene terephthalate): acrylate rubber weight ratio. As seen in the other Tables, the maximum percent elongation is often better in ECHO A$^{TM}$ cured examples.

The data of Table 4 compares ECHO A™ (2,5-dimercapto-1,3,4-thiadiazole curative) cured compositions with RD 882A (a derivative of 2,5-dimercapto-1,3,4-thiadiazole) cured compositions and with Vanox 829 (also a derivative) cured compositions. The ECHO A™ cured example (18) has lower compression set than the others (Examples 19–22).

The data of Table 5 illustrates the ECHO A™ curative results in thermoplastic elastomers with lower compression set irrespective of the commercial acrylate polymer used, e.g. Cyanacryl™ 1803, Cyanacryl L, and Cyanacryl 2503.

The data of Table 6 illustrates that the ECHO A™ type curative for acrylate rubber can be used in thermoplastic elastomers based on a thermoplastic polyamide rather than polyester.

In Tables 1 through 5, poly(butylene terephthalate) is PBT 2002 available from Celenese Corporation having a Tg (glass transition temperature) of about 40–50° C. and a melting temperature of from about 210 to about 240° C. The acrylate AR-71 was purchased from Nippon Zeon prior to 1993 and is a copolymer of ethyl acrylate and vinyl chloroacetate having about 5 mole percent vinyl-chloroacetate. The Naugard™ 445 is an amine antioxidant available from Uniroyal Chemical. The flow control agent is Kemamide S-221 an additive available from Witco Chemical. The Hytemp™ NPC-50 is an ammonium salt which is a 50 percent active in acrylate rubber available from Nippon Zeon. Curative C-50 is 2-ethylhexanoic acid available from American Cyanamid added in a masterbatch form. HVA-2 is m-phenylene bismaleimide. The NPS red oil soap was technical grade sodium oleate available from National Purity Soap and Chemical. The Echo™ is a derivative of 2,5-dimercapto-1,3,4-thiadiazole available from the Hercules. RD 882A is a derivative of 2,5-dimercapto-1,3,4-thiadiazole available from RT Vanderbilt. VANOX 829 is a derivative of 2,5-dimercapto-1,3,4-thiadiazole available from RT Vanderbilt. RD 882B is a crosslinking activator of aliphatic amine available from RT Vanderbilt.

Cyanacryl™ 1803 is an ethyl acrylate copolymer with 5 percent or less vinyl chloroacetate. Cyanacryl™ L 2503 is an ethyl acrylate copolymer with 5 percent or less of a chlorine containing crosslinking site such as from vinyl chloroacetate. Cyanacryl™ 2503 is an ethyl acrylate copolymer with 5 percent or less of a chlorine containing crosslinking site such as from vinyl chloroacetate. These polymers are available from American Cyanamid and have different low temperature brittleness values (e.g. –18° C. and –28° C.).

In Table 6 4051 EP, 4052 EP and 4054 EP are acrylate rubbers from Nippon-Zeon with about 1 to 5 mole percent vinyl chloroacetate. The value in Table 6 following the compounds is their Tg.

The characterization of physical properties in Tables 1–5 included ultimate tensile (UTS), maximum percent elongation also known as elongation at break and modulus (M) at 100 percent elongation. Tensile properties were determined with ASTM D638. Unless otherwise specified the samples were pulled at 50.8 cm per minute to failure. The tension set was according to ASTM D638 and involved elongation to 100 percent for 10 minutes at 23–25° C. and the measurement of the increase of the sample length over the initial length 10 minutes after removing the stress and reporting it over the original sample length as a percent. The oil swell test measured the increase in the specimens mass according to ASTM D471 after immersion at 150° C. for 70 hours using ASTM #3 oil reported as a percentage of original mass. The compression set was according to ASTM D395 and involved 25 percent compression for the time and at the temperature cited and measurement and reporting of the percent of that 25 percent compression which remained after the stress was removed. Shore A and Shore D are well known characterizations of rubber hardness. Percent weight change was a gravimetric determination of the effect of aging at 177° C.

TABLE 1

Curative Study for Polyester/Acrylate System

|  | Contr. 1 | Contr. 2 | Contr. 3 | Ex. 4 |
|---|---|---|---|---|
| Poly(butylene terephthalate) | 33.3 | 33.3 | 33.3 | 33.3 |
| AR-71 Acrylate | 105 | 105 | 105 | 105 |
| Naugard ™ 445 | 2 | 2 | 2 | 2 |
| Kemamide ™ 22 | 2 | 2 | 2 | 2 |
| Quaternary Ammonium Salt Masterbatch HPTEMP NPC-50 | 3 | — | — | — |
| Potassium Stearate | 2 | — | — | — |
| Curative C-50 | — | 7 | 7 | — |
| HVA-2 | — | — | .75 | — |
| NPS Red Oil Soap | — | — | — | 3.5 |
| ECHO A ™ | — | — | — | 0.5 |
| INITIAL PHYSICAL PROPERTIES | | | | |
| Ultimate Tensile Strength (UTS), MPa | 7.45 | 5.66 | 6.69 | 7.10 |
| Max. % Elongation | 165 | 160 | 170 | 220 |
| Modulus (M) 100%, MPa | 5.24 | 4.28 | 4.83 | 4.14 |
| % Tension Set | 11 | 8 | 9 | 10 |
| Oil Swell (70H, 150° C.) | 14 | 11 | 10 | 10 |
| Compression Set 25% (70H, 150° C.) | 63 | 44 | 48 | 40 |
| Shore A | 73 | 70 | 73 | 70 |
| HOT AIR AGING AT 177° C. FOR 168 HRS | | | | |
| UTS, MPa | 7.86 | 6.34 | 7.38 | 7.79 |
| Max. % Elongation | 250 | 180 | 170 | 280 |
| Modulus 100%, MPa | 4.17 | 4.17 | 5.03 | 3.66 |
| Shore A | 69 | 70 | 70 | 70 |
| % Wt. Change | 1 | 6 | 1 | 1 |

TABLE 2

Polyester/Acrylate-Curative Level Study

| | Ex. 5 | Ex. 6 | Ex. 7 | Ex. 8 | Ex. 9 | Ex. 10 |
|---|---|---|---|---|---|---|
| Poly(butylene terephthalate) | 33.3 | 33.3 | 33.3 | 33.3 | 33.3 | 33.3 |
| AR-71 Acrylate | 105 | 105 | 105 | 105 | 105 | 105 |
| Naugard ™ 445 | 2 | 2 | 2 | 2 | 2 | 2 |
| Kemamide ™ 221 | 2 | 2 | 2 | 2 | 2 | 2 |
| NPS Red Oil Soap | 3.5 | 3.5 | 3.5 | 2.5 | 4.5 | 1.0 |
| ECHO A ™ | 0.5 | 1.0 | 1.5 | 1.0 | 1.0 | 1.0 |
| PHYSICAL PROPERTIES | | | | | | |
| UTS, MPa | 7.79 | 6.34 | 5.86 | 5.97 | 7.03 | 5.93 |
| Max % Elong. | 210 | 170 | 140 | 170 | 153 | 130 |
| M 100 %, MPa | 4.62 | 4.69 | 4.90 | 4.41 | 5.17 | 5.14 |
| % Tension Set | 11 | 11 | 10 | 11 | 10 | 9 |
| Compression Set 25% (70H, 150° C.) | 31 | 34 | 35 | 38 | 34 | 42 |
| Oil Swell (70H, 150° C.) | 9 | 10 | 7 | 11 | 7 | 10 |
| Shore A | 72 | 72 | 75 | 73 | 71 | 74 |
| AFTER HOT AIR AGING AT 177° C. FOR 168 HRS | | | | | | |
| UTS, MPa | 9.79 | 9.41 | 9.97 | 8.76 | 10.0 | 10.1 |
| Max. % Elong. | 300 | 295 | 290 | 300 | 270 | 265 |
| M 100%, MPa | 4.28 | 4.14 | 4.55 | 4.10 | 4.55 | 4.83 |
| % Wt. Change | 3 | 4 | 4 | 4 | 4 | 3 |
| Shore A | 74 | 72 | 77 | 75 | 74 | 76 |

TABLE 3

Polyester/Acrylate Study: Different Hardness

| | Contr. 11 | Contr. 12 | Contr. 13 | Ex. 14 | Ex. 15 | Ex. 16 |
|---|---|---|---|---|---|---|
| Poly(butylene terephthalate) | 25 | 33.3 | 66.6 | 25 | 33.3 | 66.6 |
| AR-71 Acrylate | 105 | 105 | 105 | 105 | 105 | 105 |
| Naugard ™ 445 | 2 | 2 | 2 | 2 | 2 | 2 |
| Kemamide ™ S-221 | 2 | 2 | 2 | 2 | 2 | 2 |
| Hytemp ™ NPC-50 | 3 | 3 | 3 | — | — | — |
| Potassium Stearate | 2 | 2 | 2 | — | — | — |
| NPS Red Oil Soap | — | — | — | 3.5 | 3.5 | 3.5 |
| ECHO A ™ | — | — | — | 0.5 | 0.5 | 0.5 |
| INITIAL PHYSICAL PROPERTIES | | | | | | |
| UTS, MPa | 5.03 | 6.48 | 12.1 | 5.52 | 8.00 | 11.0 |
| Max. % Elong. | 150 | 180 | 200 | 220 | 250 | 160 |
| M 100 %, MPa | 3.72 | 4.41 | 9.03 | 2.90 | 4.14 | 8.97 |
| % Tension Set | 8 | 13 | 33 | 8 | 13 | 32 |
| Oil Swell (70H, 150° C.) | 9 | 11 | 9 | 9 | 9 | 8 |
| Compression Set 25% (70H, 150° C.) | 58 | 64 | 81 | 32 | 39 | 67 |
| Shore A/D* | 60 | 72 | 38D | 60 | 68 | 37D |
| HOT AIR AGING AT 177° C. FOR 168 HRS | | | | | | |
| UTS, MPa | 6.66 | 7.48 | 10.7 | 7.03 | 8.14 | 12.0 |
| Max. % Elong. | 250 | 260 | 180 | 305 | 290 | 230 |
| M 100%, MPa | 2.97 | 3.52 | 8.62 | 2.66 | 3.66 | 8.69 |
| % Wt. Change | 3 | 4 | 3 | 3 | 3 | 3 |
| Shore A/D* | 57 | 73 | 39D | 61 | 70 | 37D |

*The reported value is a Shore A reading unless followed by a D indicating Shore D.

TABLE 4

Poly (butylene acrylate)/Acrylate: Different Thiadiazole/Amine Cure Systems

| | Ex. 17 | Ex. 18 | Ex. 19 | Ex. 20 | Ex. 21 | Ex. 22 |
|---|---|---|---|---|---|---|
| Poly(butylene terephthalate) | 33.3 | 33.3 | 33.3 | 33.3 | 33.3 | 33.3 |
| AR-71 Acrylate | 105 | 105 | 105 | 105 | 105 | 105 |
| Naugard ™ 445 | 2 | 2 | 2 | 2 | 2 | 2 |
| Kemamide ™ S-221 | 2 | 2 | 2 | 2 | 2 | 2 |
| ECHO A ™ | — | 0.5 | — | — | — | — |
| RD 882A[1] | — | — | 1.0 | — | 2.5 | — |
| Vanox 829[2] | — | — | — | 1.0 | — | 1.0 |
| NPS Red Oil Soap | 2 | 3.5 | 3.5 | 3.5 | — | — |
| Hytemp ™ NPC-50 | 3 | — | — | — | — | — |
| RD 882B[3] | — | — | — | — | 1.5 | 1.5 |
| PHYSICAL PROPERTIES | | | | | | |
| UTS, MPa | 6.62 | 7.45 | 5.03 | 4.83 | 6.41 | 4.83 |
| Max. % Elong. | 170 | 220 | 160 | 140 | 180 | 140 |
| M 100 %, MPa | 4.59 | 4.14 | 3.86 | 4.14 | 4.55 | 4.14 |
| % Tension Set | 11 | 11 | 7 | 8 | 10 | 8 |
| Oil Swell (70H, 150° C.) | 11 | 10 | 7 | 11 | 10 | 1i |
| Compression Set 25% (70H, 150° C.) | 74 | 39 | 61 | 64 | 59 | 64 |
| Shore A | 72 | 71 | 68 | 69 | 73 | 69 |

[1]RD 882A is a thiadiazole derivative from R. D. Vanderbilt.
[2]Vanox 829 is a thiadiazole derivative from R. D. Vanderbilt.
[3]RD 882B is an aliphatic amine accelerator from R. D. Vanderbilt.

TABLE 5

Poly(butylene terephthalate)Acrylate: Different Vinyl Chloroacetate Contents

| Material | Contr. 23 | Ex. 24 | Contr. 25 | Ex. 26 | Contr. 27 | Ex. 28 |
|---|---|---|---|---|---|---|
| Poly (butylene-terephthalate) | 33.3 | 33.3 | 33.3 | 33.3 | 33.3 | 33.3 |
| Cyanacryl ™ 1803 | 100 | 100 | — | — | — | — |
| Cyanacryl ™ L | — | — | 100 | 100 | — | — |
| Cyanacryl ™ 2503 | — | — | — | — | 100 | 100 |
| Naugard ™ 445 | 2 | 2 | 2 | 2 | 2 | 2 |
| Kemamide ™ S-221 | 2 | 2 | 2 | 2 | 2 | 2 |
| Hytemp ™ NPC-50 | 3 | — | 3 | — | 3 | — |
| Potassium Stearate | 2 | — | 2 | — | 2 | — |
| ECHO A ™ | — | 0.5 | — | 0.5 | — | 0.5 |
| NPS Red Oil Soap | — | 3.5 | — | 3.5 | — | 3.5 |
| PHYSICAL PROPERTIES | | | | | | |
| UTS, MPa | 8.20 | 7.14 | 7.93 | 6.21 | 2.76 | 3.24 |
| Max. % Elong. | 200 | 195 | 190 | 200 | 140 | 110 |
| M 100 %, MPa | 4.83 | 4.34 | 5.00 | 3.79 | 2.41 | 3.03 |
| % Tension Set | 16 | 9 | 13 | 10 | — | — |
| Oil Swell (70H, 150° C.) | 10 | 11 | 14 | 16 | 15 | 21 |

TABLE 5-continued

Poly(butylene terephthalate)Acrylate:
Different Vinyl Chloroacetate Contents

| Material | Contr. 23 | Ex. 24 | Contr. 25 | Ex. 26 | Contr. 27 | Ex. 28 |
|---|---|---|---|---|---|---|
| Compression Set 25% (70H, 150° C.) | 69 | 45 | 66 | 47 | 59 | 45 |
| Shore A | 72 | 67 | 75 | 66 | 56 | 61 |

TABLE 6

Nylon/Acrylate Dynamic vulcanizates

| Material | Contr. 29 | Ex. 30 | Contr. 31 | Ex. 32 | Contr. 33 | Ex. 34 |
|---|---|---|---|---|---|---|
| Nylon 6 | 33.3 | 33.3 | 33.3 | 33.3 | 33.3 | 33.3 |
| 4051 EP (−15C.) | 100 | 100 | — | — | — | — |
| 4052 EP (−28C.) | — | — | 100 | 100 | — | — |
| 4054 (−40C.) | — | — | — | — | 100 | 100 |
| Naugard ™ 445 | 2 | 2 | 2 | 2 | 2 | 2 |
| Kemamide ™ S-221 | 2 | 2 | 2 | 2 | 2 | 2 |
| Hytemp ™ NPC-50 | 2 | — | 2 | — | 2 | — |
| Potassium Stearate | 4 | — | 4 | — | 4 | — |
| ECHO A ™ | — | 0.5 | — | 0.5 | — | 0.5 |
| NPS Red Oil Soap | — | 3.5 | — | 3.5 | — | 3.5 |
| PHYSICAL PROPERTIES | | | | | | |
| UTS, MPa | 1660 | 1800 | 890 | 970 | 910 | 1035 |
| Max. % Elong. | 210 | 240 | 140 | 140 | 120 | 140 |
| M 100 %, MPa | 840 | 830 | 720 | 790 | 810 | 810 |
| % Tension Set | 12 | 16 | 18 | 18 | 18 | 18 |
| Oil Swell (70H, 150° C.) | 11 | 9 | 14 | 13 | 39 | 36 |
| Compression Set 25% (70H, 150° C.) | 55 | 76 | 68 | 82 | 76 | 84 |
| Shore A | 73 | 81 | 76 | 77 | 79 | 77 |

It is desirable that the thermoplastic elastomers of this disclosure have a ultimate tensile strength above 5 MPa, more desirably above 6 MPa, and preferably above 7 MPa. It is desirable that they have a modulus at 100% elongation of at least 4 MPa, more desirably at least 4.4, and preferably above 4.6 MPa. It is desirable that they have an oil swell value (70 hrs., 150° C., #3 ASTM oil) of less than 40 and more desirably less than 25. It is desirable that they have elongation at break of at least 120 or 140%, more desirable at least 180%, and preferably at least 200%. It is desirable that they have a compression set after 10 minutes relaxation from a compression of 25% held 70 hours at 150° C. of less than 45 or 50% more desirably less than about 40%, more desirably less than about 35% and preferably less than about 30% of the initial compression. It is desirable that the ultimate tensile strength and elongation at break not decrease upon aging at 177° C. for 168 hours. It is desirable that the modulus at 100% elongation not vary more than 50% and more desirably not vary more than 25% upon aging at 177° C. for 168 hours.

While in accordance with the patent statutes the best mode and preferred embodiment has been set forth, the scope of the invention is not limited thereto, but rather by the scope of the attached claims.

What is claimed is:

1. A thermoplastic elastomer composition comprising a blend of
   a) an acrylate rubber dynamically crosslinked with a curing system consisting essentially of 2,5-mercapto-1,3,4-thiadiazole or a derivative thereof, and a basic material selected from the group consisting of magnesium hydroxide, magnesium oxide, calcium oxide, calcium hydroxide, barium oxide, barium carbonate, sodium phenoxide, sodium oleate and sodium acetate, and
   b) from about 20 to about 80 parts by weight per 100 parts of said acrylate rubber of a thermoplastic polymer comprising a polyester, polycarbonate, or polyamide, or combinations of polyester and polycarbonate,
   wherein said acrylate rubber and said thermoplastic polymer are sufficiently compatible to form a thermoplastic elastomer, said thermoplastic elastomer having a compression set value according to ASTM D395 (70 hours at 150°) of less than 50 percent without additional curing following dynamic crosslinking.

2. A thermoplastic elastomer according to claim 1, wherein said curing system is 2,5-mercapto-1,3,4-thiadiazole and sodium oleate.

3. A thermoplastic elastomer according to claim 1 having an ultimate tensile strength of at least 5 MPa and an elongation at break of at least 120 percent.

4. A thermoplastic elastomer according to claim 1, wherein said thermoplastic polymer comprises a polyester, a polycarbonate, or combinations thereof.

5. A thermoplastic elastomer according to claim 1, wherein said acrylate polymer has from about 0.5 to about 5 mole percent halogen-containing repeat units.

6. A thermoplastic elastomer according to claim 1, wherein said thermoplastic polymer is poly(butylene-terephthalate) and said acrylate rubber is a copolymer of at least one acrylate monomer and from about 0.5 to about 5 mole percent of a chlorine-containing repeat unit.

7. A thermoplastic elastomer according to claim 1, wherein the 2,5-mercapto-1,3,4-thiadiazole or its derivative is present in amounts from about 0.5 to about 5 parts per 100 parts of said acrylate rubber.

8. A thermoplastic elastomer according to claim 1, wherein said thermoplastic polymer is a polyamide.

* * * * *